(12) United States Patent
Othmer et al.

(10) Patent No.: US 8,032,118 B1
(45) Date of Patent: Oct. 4, 2011

(54) VISUAL VOICEMAIL WHEN MOBILE DEVICE IS OUT OF DATA COVERAGE

(75) Inventors: Konstantin Othmer, Mountain View, CA (US); Douglas R. Van Kirk, San Mateo, CA (US)

(73) Assignee: Core Mobility, Inc., Mountain View, CA (US)

( * ) Notice: Subject to any disclaimer, the term of this patent is extended or adjusted under 35 U.S.C. 154(b) by 628 days.

(21) Appl. No.: 11/692,031

(22) Filed: Mar. 27, 2007

(51) Int. Cl.
 *H04M 1/725* (2006.01)
(52) U.S. Cl. ........... 455/412.1; 455/412.2; 455/413; 455/432.1
(58) Field of Classification Search ............ 370/328, 370/389, 401, 352; 707/536; 455/412.1, 455/412.2, 413, 432.1
See application file for complete search history.

(56) References Cited

U.S. PATENT DOCUMENTS

| | | | |
|---|---|---|---|
| 2002/0165885 A1* | 11/2002 | Kumhyr et al. | 707/536 |
| 2003/0063580 A1* | 4/2003 | Pond | 370/328 |
| 2004/0172254 A1* | 9/2004 | Sharma et al. | 704/270.1 |
| 2005/0010644 A1* | 1/2005 | Brown et al. | 709/206 |
| 2006/0246878 A1* | 11/2006 | Khoury | 455/412.2 |
| 2006/0274721 A1* | 12/2006 | Flanagan | 370/352 |
| 2008/0008163 A1* | 1/2008 | Castell et al. | 370/352 |
| 2008/0055264 A1* | 3/2008 | Anzures et al. | 345/173 |
| 2008/0261564 A1* | 10/2008 | Logan | 455/413 |
| 2009/0117880 A1* | 5/2009 | Sipher | 455/412.2 |
| 2009/0253420 A1* | 10/2009 | Stewart et al. | 455/417 |
| 2009/0253428 A1* | 10/2009 | Bhatia et al. | 455/432.1 |
| 2010/0098236 A1* | 4/2010 | Pearson | 379/211.02 |

* cited by examiner

*Primary Examiner* — Barry W Taylor
(74) *Attorney, Agent, or Firm* — Workman Nydegger

(57) ABSTRACT

Messages are received at a server and processed to generate data that may include a call back number, envelope information or contact information. Generated data is transmitted to a device that displays a visual notification that includes some of the generated data. The notification may be displayed on the device even if the device is unable to retrieve the message over a data channel. The notification alerts the user that a message is waiting for the user. If the device is subsequently within a data network, the device automatically retrieves the message over a data channel. The device can also establish a voice call with a message server to retrieve the message and can record the message. The device can establish the voice call with the server at a call back number and/or issue a DTMF message request to directly access the message without requiring menu navigation.

20 Claims, 7 Drawing Sheets

VISUAL VOICEMAIL WHEN MOBILE DEVICE IS OUT OF DATA COVERAGE

CROSS REFERENCE TO RELATED APPLICATIONS

Not Applicable.

BACKGROUND OF THE INVENTION

1. The Field of the Invention

The present invention relates generally to voice message systems. More particularly, embodiments of the invention relate to systems and methods for delivering voice messages over voice channels to communication devices.

2. The Relevant Technology

Subscribers of voice messaging services typically receive visual notifications of new messages waiting on their communication device. These notifications are often limited to an indication of the number of messages that are waiting in a subscriber's inbox. In some cases, the communication only contains an indication that the inbox contains at least one voice messages, but no indication of the exact number of voice messages, leaving the user with the uncertainty as to how much time will be spent reviewing their voice messages, or even misleading the user into thinking that only one voice message is waiting. The subscriber may be entirely unaware of who left the message and when it was left.

Furthermore, listening to and learning the content of a voice message often requires establishing a network connection to the message server, a process which can take several seconds or more to complete, and which often requires navigating through the message server's menu before finally being able to listen to a message. In addition, the use of a conventional voice mail system requires the user to access his or her messages sequentially in the order they were received. Even when a user is listening to previously played and/or saved messages, the user is typically required to skip messages until the desired message is located. Also, conventional voice mail systems do not provide a way for users to determine who a message is from until the content of each message is played. Thus, in order to reach and play a desired message, the user may be required to listen to at least a part of every received message in the queue prior to reaching the desired message.

One solution to the lack of instantaneous access to voice messages is to automatically deliver each message in its entirety to a communication device while connected with a communication network, as can be done with Multimedia Messaging Service ("MMS") messages. For example, when an MMS message is created using an MMS client, it is submitted to a home MMS Center ("MMSC"), and then sent by the home MMSC to the recipient MMSC. The recipient MMSC sends a notification (e.g., an SMS message via a control channel) to the recipient's wireless device, and the MMS client on the recipient's wireless device automatically retrieves the MMS message from the recipient MMSC after receiving the notification. MMS voice messages, besides being delivered automatically, have the additional advantage of being stored locally on both the sending and receiving wireless device so that either the sender or the receiver can forward the voice message to other devices and have instant access to the voice message as long as the message is stored on the users' device.

One problem with conventional MMS systems is that MMS messages can only be retrieved by the recipient MMS client via a data channel (e.g., in a data network), even though the notification is often sent to the recipient device via a control channel (e.g., a control network). While data networks can be coextensive with control networks, this is not always the case, for example when roaming on another operators network. Thus, a recipient device can receive a notification via the control channel and nevertheless be unable to retrieve the corresponding message if the recipient device is outside the data network. In some cases, the recipient device cannot retrieve the message and does not alert the device user that a message is waiting until the message is actually retrieved from the data channel. Consequently, the user remains unaware of the message and, even if made aware of the message, could not access the message until the recipient device is located in the data network. Thus, when using the MIMS delivery system, there is an issue when the user is not in data coverage. This creates the problem that retrieving messages is now less reliable than with conventional voice mail systems since the user can call his voice mail while roaming. This creates a tradeoff between the better experience of MMS, but poorer reliability of message retrieval.

Further, MMS systems do not address issues relating to different voice mail systems having varying capabilities. For example, people often have multiple voice mail systems (e.g., home voice mail, work voice mail, cellular voice mail, etc.), and the ability to listen to messages on a particular voice mail system requires the user to call that specific system and navigate the menu system of that specific system in order to retrieve any voice mail messages stored therein. Potentially, a person would be required to learn two or more different and independent voice mail navigation systems. In other words, a person who has multiple voice mail systems is typically unable to retrieve all messages from multiple systems simultaneously. Even if the user's voice mail systems forward the messages to a single messaging system, the user still experiences those challenges mentioned above with regard to navigating menus and accessing voice messages sequentially. As a result, the user still spends substantial time maneuvering through their voice messaging system.

Accordingly, there currently exists a need in the art for improving voice message systems and providing alternative means for users to access received voice messages.

BRIEF SUMMARY OF THE INVENTION

The present invention is generally directed to systems and methods for managing voice messages and, in particular, allowing a user to easily view and access voice messages. Individual voice messages, including multimedia messaging service ("MMS") messages, can be visually represented on a device even if the device has not yet retrieved the voice messages. According to one aspect of the invention, each visual notification includes a thumbnail icon or other visual notification and/or other information regarding attributes of the message, such as identification of the sender of the message. While useful in many different situations, embodiments of the invention are particularly useful when a device is roaming and/or outside of a data network.

One embodiment of the invention enables a device, such as a wireless cellular device, to become a central inbox for all messages from a user's various voice message systems. A message server interacts with the user's voice message systems to receive and/or retrieve the user's voice messages. The message server then processes the various messages to generate notification data about the messages, which notification data can be visually and/or audibly rendered on the user's device. The generated data is then sent to the device to notify the user that one or more messages are waiting at the message server. The device then displays at least a portion of the generated data for each message waiting.

Advantageously, the user can be apprised of the existence of the voice message by viewing the notification data even if the device is roaming, out of a data network or otherwise unable to retrieve the voice message via a data channel. If the device is subsequently within the data network, the device can automatically retrieve the voice message via the data channel and display a visual notification of the message, such that the user can select the visual notification and access the voice message immediately.

According to one embodiment of the invention, the device is used to retrieve and/or record voice messages over a voice channel, such as when the device is roaming and/or out of data coverage. The device receives a notification that a message is waiting at the message server and establishes a voice call with the message server to retrieve the message. Establishing the voice call may be done automatically or in response to user input. Playback of the voice message over a voice channel begins after establishing the voice call with the message server. Optionally, the device records the message. The device generates a visual notification of the message which can be selected to begin playback of the recorded message.

Particular voice messages can be accessed directly over a voice channel without navigating menus. When a message intended for a recipient is received by the message server, the message server assigns a message identifier, in a preferred embodiment, a call back number, to the message. The recipient identifier identifies the device of the intended recipient and can be, for example, a mobile device number associated with the device. The server transmits a notification to the recipient's device that a message is waiting for the device at the server. The notification can include the message identifier, in a preferred embodiment, the call back number. When the recipient device calls the server via the call back number, the server receives a voice call. The server uses Automatic Number Identification (ANI) to identify the recipient account and Dialed Number Identification Service (DNIS) to identify the particular message being retrieved. This allows the server to retrieve a specific message for this recipient and, thus, enables the recipient to retrieve voice messages in a non-sequential manner.

According to another embodiment, voice messages can be accessed directly over a voice channel without user intervention. The message server receives a message intended for the recipient and stores it, assigning a message number or other message identifier to the message. The server transmits a notification to the device of the intended recipient. The notification includes the message identifier, which is essentially a reference pointing back to the message on the server. Upon receiving the notification or at it's earliest convenience, the device establishes a voice call with the server, potentially transparent to the user. The server may identify a device identifier for the device from which the call originates using ANI or some other mechanism, and use the device identifier to authenticate the device. The device can then issue a set of commands using DTMF to retrieve the message, such as by requesting the message by message identifier. Or, in another embodiment, rather than use DTMF tones the device can call a number associated with the message and the server uses DNIS to play the correct message. The device can then record the message locally on the device and present a notification to the user.

Embodiments of the invention for delivering a notification of a voice message and accessing the voice message via a voice channel can be used in conjunction with wireless communication devices as well as land line devices.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Figure 1A:
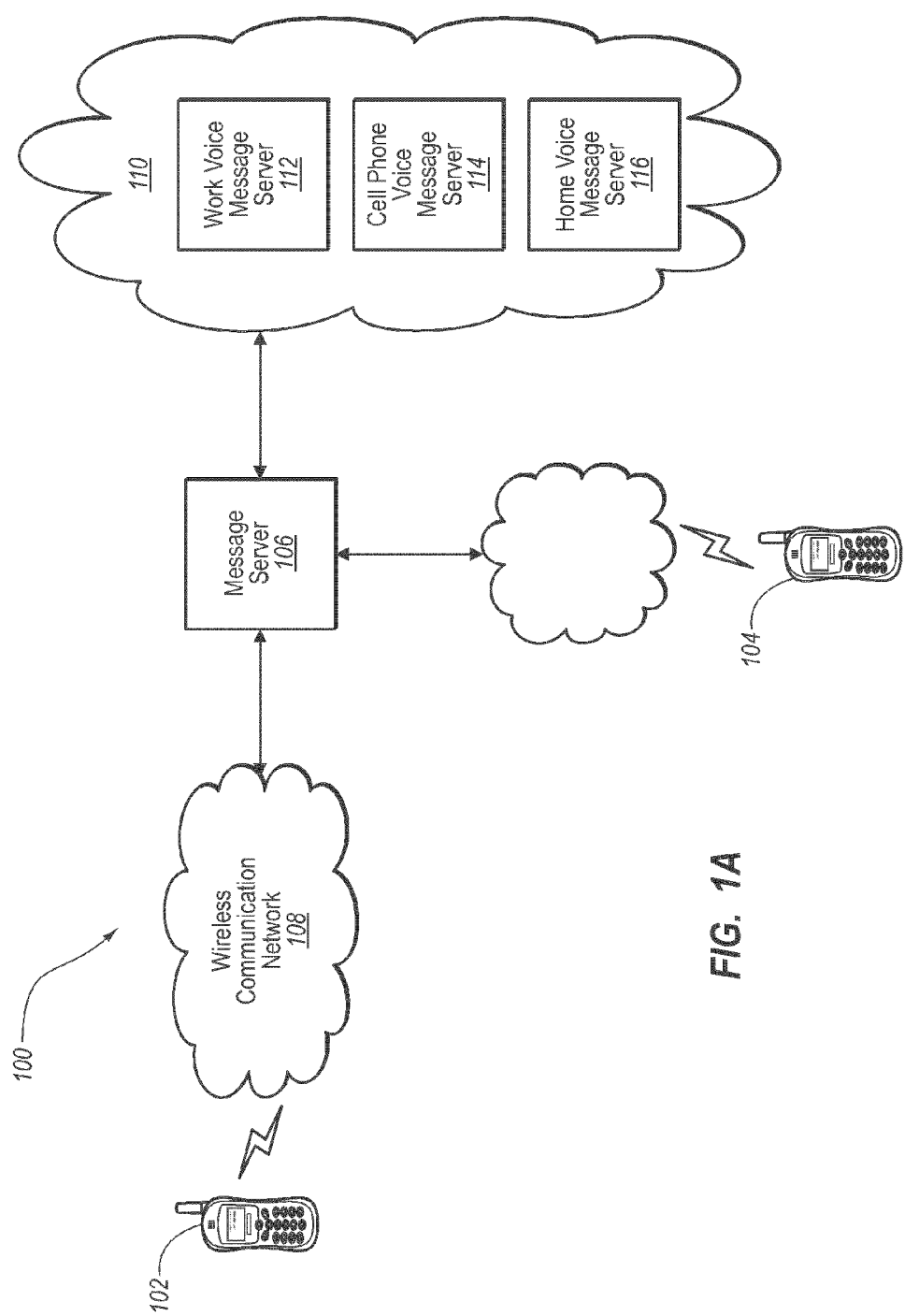
FIG. 1A illustrates one embodiment of a communications network over which voice messages can be sent and received.

The present invention relates to voice messaging systems and to the delivery and retrieval of voice messages. Embodiments of the invention enable a device, such as a cellular telephone, to serve as an inbox for voice messages. The device can be used to create and access messages without having to maneuver through time-consuming voice messaging navigation systems or to access voice messages sequentially. The invention can also eliminate the need to independently access each of multiple voice message systems, as well as the requirement of navigating through multiple voice message menu systems. The device can be used to notify a user that a voice message has been received by a message server even though the device may be unable to receive the voice message in its default manner (e.g., data channel). The device can access the voice messages through a voice channel. Furthermore, the device may be used to record and store voice messages during playback of the voice messages over the voice channel.

A message server stores voice messages intended for a user. The message server may be a standalone voice message system and/or may interact with the user's other voice message systems to receive and/or retrieve voice messages or segments of the voice messages from those systems. The message server then interacts with the user's device to make the device aware of any voice messages. This is done, for example, by pushing notification data to the device relating to the received voice message through any of a number of means, but most commonly via a control or signaling channel of the network, whereupon the device may notify a user by presenting a visual notification of the voice message in a user interface ("UI") and/or an audible tone to the user. According to one embodiment, the data presented to the user in the visual notification ensures that the user can access the voice messages in a non-sequential manner. The user can simply click on the message and the device will automatically call an assigned call back number associated with each voice message and the corresponding voice message is played at the user's device.

According to another embodiment, the data indicative of the received voice message is received at a time when the user's device is outside of a data network coverage area, preventing the user's device from retrieving the voice message via a data channel. In this case, the user's device still notifies the user of the received message, but the notification may include instructions to call in to the message server to retrieve the message if the user's device is within a voice network coverage area. If the device is subsequently inside of a data network coverage area, the device may retrieve the voice message via a data channel and change the notification to reflect that the voice message has been retrieved.

According to yet another embodiment of the invention, the device calls the message server and plays back voice messages stored on the message server when the device is roaming outside of a wireless network associated with a first wireless operator to which the user of the device subscribes. The device records the audio and stores the voice message in an inbox of the device. The device may require user input to initiate retrieval of the voice message or, alternatively, may automatically retrieve the voice messages in a manner transparent to the user. The device may automatically retrieve the voice messages using DTMF signaling, for example.

Embodiments of the invention are therefore directed to message systems and, in particular, to systems and methods for managing messages using a single device, including enabling a user to access voice messages when outside of a data network and/or while roaming. While embodiments of the invention are described in the context of voice messages, one of skill in the art can appreciate that embodiments of the invention also apply to other types of messages that are delivered over various networks. Examples include instant voice messages (i.e., voice messages that are created and sent without initiating a telephone call to the recipient), MMS messages, email messages that may or may not have been converted to voice, SMS messages, and the like, or any combination thereof.

FIG. 1A is a block diagram illustrating an exemplary communication system in which embodiments of the invention can be practiced. Wireless communication system 100 includes a communication device 102 that can be used, among other things, to create, transmit and receive messages, including voice messages. Messages may be transmitted to or received from a wireless device 104 which represents generally any device capable of receiving or sending messages. Additionally, various voice message systems 110 can also transmit messages to communication device 102. For example, messages may be transmitted to or from a device over a Public Switched Telephone Network (PSTN), over an Internet Protocol (IP) Network, over a wireless RF network, and the like or any combination thereof. Communication device 102 can be a wireless or mobile telephone, a conventional wired telephone, a Personal Digital Assistant (PDA), a laptop computer, or any other device able to communicate over a network.

In the embodiment of FIG. 1A, communication device 102 communicates with a message server 106 through network 108, which may be a wireless network, a PSTN, a wired/ wireless IP based network, and the like or any combination thereof. All or a part of the network 108 may facilitate data communication via data channels and/or voice communication via voice channels. Additionally, control channels may be used for, among other things, transmitting message notifications to the device 102. Areas within which data communication is enabled may be referred to as data network coverage areas or data networks. Similarly, areas within which voice communication is enabled may be referred to as voice network coverage areas or voice networks. Finally, areas within which control channels function may be referred to as control network coverage areas or control networks. Data, voice and control networks may overlap (i.e., coexist) or may exist independent of one another within the network 108.

In one embodiment, the network 108 is associated with a wireless operator providing services to which the device 102 (or more particularly, a user associated with the device 102) subscribes. Alternately, the network may be associated with a different wireless operator whose services the user of device 102 does not subscribe to. When the device operates in a network 108 associated with a different wireless operator, the device is said to be roaming.

Message server 106 may be a computer system that routes incoming and outgoing messages and performs other operations described herein. In one embodiment, the message server 106 communicates with voice message systems 110. The voice message systems 110 may include one or more voice message servers that reside on one or more networks. Examples of such voice message servers include work voice message server 112, cell phone voice message server 114 and home voice message server 116. As described below, the message server 106 can interact with the voice message systems 110 in a manner that enables the device 102 to have access to all of the voice messages stored on the voice message systems 110 without requiring the user to independently access the various voice message systems. Although the invention is described in the context of a message server 106 that interacts with multiple voice message systems 110, the invention can also be practiced with a single voice message system.

The message server 106 can serve as a focal point of a voice message system for the device 102. In other words, the message server 106 becomes a messaging gateway for the device 102. For instance, the message server 106 can retrieve voice messages from the device 104 and/or other voice message systems 110. Further, the message server 106 can transmit all or a part of these messages to the device 102 without requiring the user to request the messages. In addition, the device 102 can become an inbox for all messages regardless of which device 104 and/or voice message system 110 the voice message is received from.

Whenever a message is received by the message server 106, the message server 106 sends a notification to the device 102. The notification contains data indicative of the received message. The notification can be used to alert the user of the existence of a new message either audibly or visually. For example, receipt of the notification by the device 102 can cause an audible sound to be played by the device. In addition, the notification enables a visual notification for each message to be displayed on a user interface ("UP") of the device 102.

In one embodiment, the message server 106 transmits the notification to device 102 using, for example, SMS notification, WAP push, HTTP push, or other push protocol. The notification may be sent over a control channel.

In embodiments where the device 102 is within a data network at the time it receives the notification, the device automatically retrieves the message over a data channel. The device 102 can store the voice message in a voice message inbox.

In embodiments where the device 102 receives the notification while outside of a data network and is unable to retrieve the voice message in the default manner described above, the UI of the device may still present a visual notification of the message. When the user selects the visual notification, a text message may appear instructing the user to call in to the message server 106 to retrieve the message. As long as the device is within a voice network, the user may be able to immediately call the message server 106 to retrieve the voice message even though the user is outside of a data network. The message server may include interactive menus that the user can navigate to retrieve the message or the message server may provide direct access to a particular message, as described below. Alternately, if the user chooses not to access the voice message while out of the data network, when the device 102 subsequently enters a data network, the device retrieves the voice message in the usual manner.

According to one embodiment of the invention, the user can call the message server and retrieve a particular message without navigating any menus. Alternately, the device may call the message server, in a manner transparent to the user, and retrieve a particular message without navigating any menus.

Figure 1B:
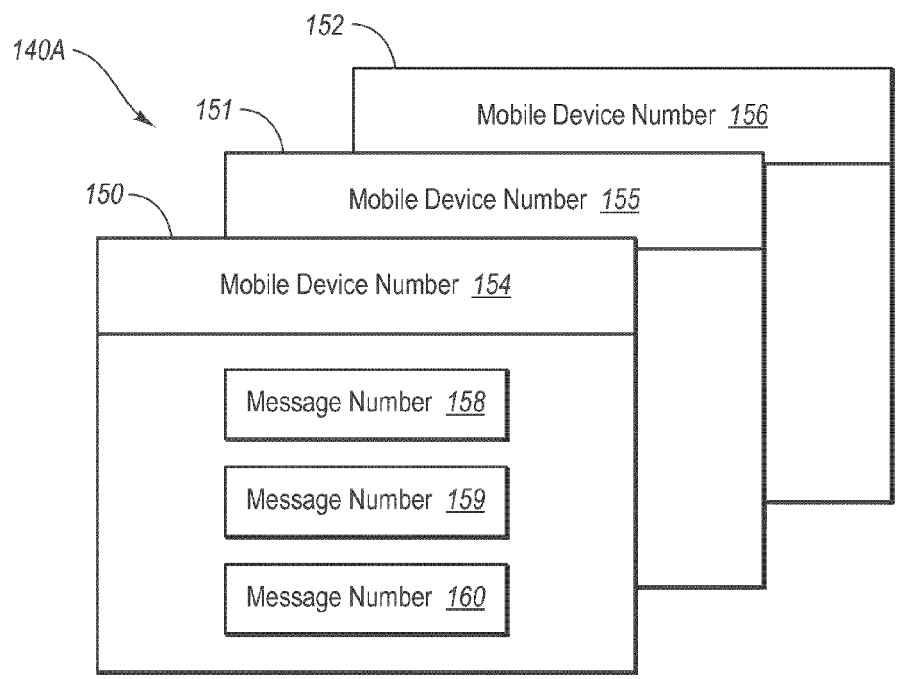
FIG. 1B illustrates one embodiment of a lookup table for storing messages for a user in a queue.

FIG. 1B illustrates a lookup table 140A that may be located at message server 106 for associating voice messages for various users in queues 150, 151, 152. One queue can be assigned per user and is associated with a device identifier 154, 155, 156 that identifies that particular user. In one embodiment, the device identifier can be a mobile device number ("MDN"). When the server receives a voice message intended for a user, the message server 106 associates the message with the assigned device identifier corresponding to the device 102. By having a device identifier associated with each particular user, the message server 106 is able to identify the queue in which messages for that user are located.

In the example of FIG. 1B, multiple voice messages have been received for a particular device, identified with device identifier 154. Each message is assigned a message identifier 158, 159, 160, which may be, for instance, a unique message number, or some other reference pointing back to the particular message. When, for example, message server 106 receives message number 160, message server 106 sends a notification, such as an SMS message, including, among other things, the message identifier 160 to the device 102. The device 102 contacts the message server to make a retrieval request. The retrieval request can include, among other things, the message identifier 160, and can be communicated to the message server using dual-tone multi-frequency ("DTMF") signaling. The message server 106 may identify the device identifier 154 using, for example, Automatic Number Identification (ANI) technology. The message server 106 identifies the device identifier 154 to identify the message queue 150 for that specific device. Once the appropriate queue 150 is located, the message server 106 uses the message identifier 160 to locate the specific message and send and/or play the message to the device 102. This particular embodiment allows the system to go directly to a specific message using the message identifier 158, 159 or 160 instead of requiring a user to listen to all of their messages sequentially to identify a particular message.

Figure 1C:
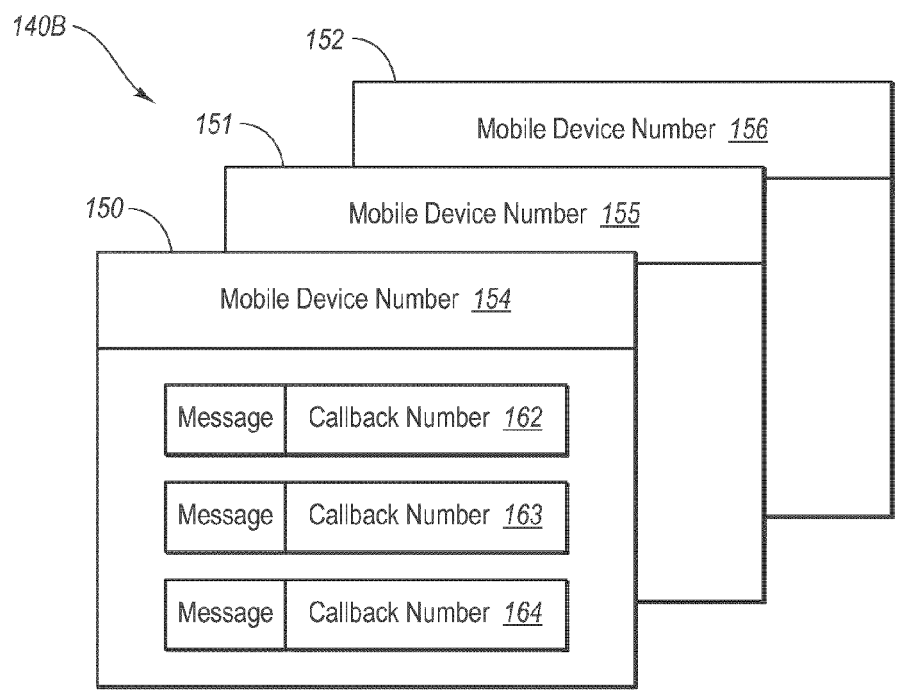
FIG. 1C illustrates another embodiment of a lookup table for storing messages for a user in a queue.

FIG. 1C depicts another embodiment of lookup table 140B. Lookup table 140B is similar to lookup table 140A except that a message identifier is not required. Additionally, this embodiment assigns a specific call back number 162, 163, 164 to each message in the user's queue. The notification can thus include at least just the call back number (e.g., 164). A message retrieval request then includes the device identifier 154 via ANI and the call back number 164 which the messaging server receives either by having a specific input for that line or via Dialed Number Identification Service (DNIS). The device identifier 154 identifies the user's queue 150 while the call back number 164, say 650-555-0164, directs the message server 106 directly to the specific message the user has selected. Since each message is associated with a different call back number, once a retrieval session has been started the user may have the ability to navigate sequentially the other messages in the user queue 150, for example, using an interactive navigation menu. According to one embodiment, the callback numbers are assigned from a bank of, for instance 100 numbers in round-robin fashion. This allows the messaging service to directly access 100 unique messages in this manner. Since most recipients only have a few messages pending at any one time, this technique allows any new message to be directly accessed.

According to another embodiment of the invention, the device is used to record a voice message retrieved while roaming and/or outside of a data network. The server sends a notification of a received voice message to the user's device. Either embodiment illustrated in FIG. 1B or 1C can be used to associate the received voice message with the user's message queue. The user's device 102 establishes a voice call with the message server 106 and playback of the voice message begins. The device records and stores the voice message in the voice message inbox. Initiation of the voice message recording/storing can be prompted by user input or may occur automatically and transparently to the user. The device may also display a visual notification of the voice message to the user in the UI which the user can select to initiate playback of the recorded voice messages.

It should be understood by one of skill in the art, with the benefit of the present disclosure, that embodiments of the invention can be implemented in many types of network environments and various network architectures are applicable. For example, the message server 106 may reside in a wireless operator's network infrastructure. In another embodiment, the message server 106 resides outside the domain of a wireless operator's infrastructure, and may be hosted, for example, by an independent hosting entity, such as an application service provider. Alternately, the message server 106 can reside behind a firewall.

Figure 2:
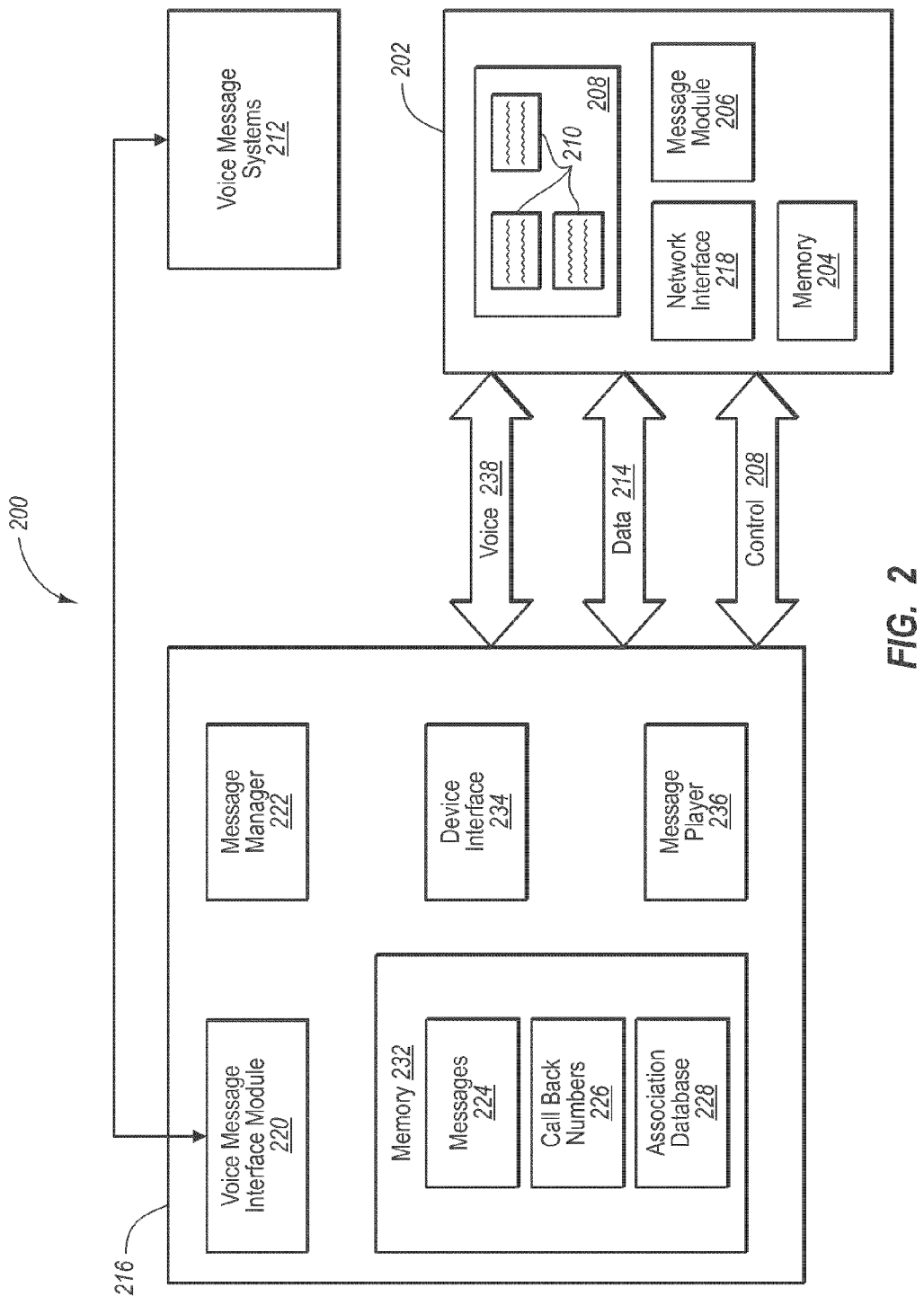
FIG. 2 illustrates one embodiment of a voice messaging system for delivering messages including voice messages.

FIG. 2 further illustrates an example of a system 200 for managing messages including voice messages and more particularly an example of a system for delivering voice messages to a user. FIG. 2 depicts how, when a message server 106 receives a new voice message, the message server sends a notification to the device. Receipt of the notification by the device can cause an icon, thumbnail or other visual notification of a voice message to appear on the UI of the device. Receipt of the notification can also cause other audible or sensory notification to occur on the device. The notification may also cause varying levels of notification to be displayed. For example, the nature of the visual notification and/or other notification may differ depending on whether the notification is being used to indicate message waiting at server and accessible by a data network (e.g., in green), message waiting at server and accessible by voice network only (e.g., in yellow), or message waiting but not accessible (e.g., in red). The notification may also differ depending on whether the voice message resides at the message server (e.g., message waiting) or has been delivered to an inbox located on the device (e.g., message retrieved).

Embodiments of the invention are described below with reference to a message server. One of skill in the art can appreciate that embodiments of the invention can also be implemented at a device level. Further, one of skill in the art can appreciate that the message server 216 can serve multiple devices or subscribers.

The message server 216 includes a voice message interface module 220 that interfaces with voice message systems 212. The user of the device 202 may provide the message server 216 with the information needed to access the voice message systems 212 of the user. The voice message interface module 220 enables the message server 216 to retrieve messages or at least a portion of the messages from the voice message systems 212. In some embodiments, the voice message systems 212 can be configured to automatically forward all messages to the device 202. Messages are typically received and stored by the message server 216 in memory 232. The memory 232 may also store multiple call back numbers 226. The call back numbers can be used by a device to establish a voice call with the message server 216.

Once a message (or portion of the message) is received by the message server 216, the message is processed by a message manager 222. The message manager 222, for example, may identify the source of the message, the intended recipient device, and other information such as the date and time the voice message is received. The identity of the intended recipient device may be specified by a device identifier, such as an MDN, associated with the device 202. Some of the data identified by the message manager 222, such as the source of the message, may be transmitted with a message-waiting notification sent to the device and may be visually presented to the user.

According to one embodiment of the invention, the message manager 222 associates messages with corresponding device identifier queues in one or more lookup tables in a database 228, as already described. This may include assigning a unique message identifier to each received message and storing the messages by message identifier in the corresponding device identifier queues. Alternately, the message manager 222 can select one call back number from the memory 232, associate the call back number with the message and store the message and callback number in the corresponding device identifier queue. As will be described more fully below, this permits a user to access a particular message from among multiple messages corresponding to the user in a non-sequential manner. Alternately, the message manager 222 may store each message in some other way which enables the user to access messages sequentially and/or non-sequentially.

The message server 216 uses a device interface 234 to send message-waiting notifications to the device 202 over a control channel 208. By way of example only, and not limitation, the control channel 208 may comprise an SS7 signaling channel typically used for call setup and the message-waiting notifications may comprise SMS messages. The notifications may include some or all of the data generated by the message manager 222, including a call back number and/or message identifier associated with the particular message as well as other message envelope information such as the name or number of the message originator. A network interface 218 on the device 202 receives the messages over the control channel. If the device 202 is within a data network, it can automatically retrieve voice messages over a data channel 214 and store the voice messages in a local memory 204, all without user intervention.

The notifications may be visually represented in a UI 208, indicating the presence of one or more voice messages waiting to be accessed. As previously stated, the notification data may be used to visually represent, or may be included in the visual representation of, a voice message on communication device 202. In one embodiment of the invention, a voice message is represented by a thumbnail icon 210 created with some or all of the notification data generated by message manager 222. For example, a thumbnail icon of a voice message might include the phone number from which the voice message originated and the time and date the voice message was received by communication device 202 or by message server 216. In another embodiment, if the message is from a known contact, the visual notification may also include any information known about the contact (e.g., a photo of the contact, a priority level for responding, a preferred method of response, etc.).

If the device 202 does not automatically retrieve a voice message over a data channel, either because the device is outside of a data network, is roaming, the user is not subscribed to data services, or for some other reason, an icon 210 representative of the voice message may still be generated and presented in the UI 208. In this case, the network interface 218 may determine that the device 202 is outside the data network or is roaming. In response to this determination, a message module 206 can generate an icon 210 used to visually represent the voice message, even though the voice message is not stored on the device 202. Selecting the icon 210 may display a message (example in FIG. 6), which notifies the recipient to dial in to access the particular message via voice channel 238. If the recipient chooses to dial, the device 202 will automatically dial the callback number 226 associated with that message and the user will immediately hear the proper message.

According to one embodiment of the invention, the network interface 218 detects that device 202 subsequently enters a data network or returns to a home network (i.e., is no longer roaming) and messaging module 206 initiates automatic retrieval of the voice message over the data channel 214 from the message server 216. Once the message has been retrieved and stored in memory 204, the message module 206 can replace the visual notification for the unretrieved voice message with a new icon representing a retrieved message. When the new icon is selected, the device can playback the voice message for the device user without dialing into the message server.

In another embodiment, the voice message can also be retrieved over a voice channel 238 while outside the data network or while roaming as long as the device 202 is within a voice network. In this case, the device receives the notification from the message server 216 over the control channel 208 while outside of the data network and an icon is generated and presented in the UI. The user selects the icon and a message (e.g., an SMS message) is displayed, including the call back number associated with the message. Note that the call back number does not have to be displayed, simply that it is somehow associated with the notification. The user can then access the message (e.g., by selecting "access message" in the icon) which causes the device to initiate a voice call using the call back number to the message server over the voice channel 238. Once the voice call is established, the device interface 234 determines the recipient device identifier (for example via ANI or DTMF), message identifier (for example via DNIS or DTMF), of the retrieval voice call. The message manager 222 uses this information to query the association database 228 for the associated voice message. The message manager 222 can then retrieve the particular message from the messages 224 and provide it to the message player 236 for playback over the voice channel 238.

In some embodiments, the message can be retrieved over a voice channel in a manner transparent to the user. For instance, upon receiving the message-waiting notification, the device may automatically initiate a voice call with the message server. Once the voice call is established, the device can issue a set of dual-tone multi-frequency ("DTMF") commands to request a particular message or the message can be accessed via DNIS as previously described. The DTMF message request may include the message identifier for the particular message. Additionally, the establishment of the voice call and the DTMF message request can be suppressed on the device such that the device user is unaware that the device is retrieving the voice message.

In some embodiments, the device 202 can record a voice message played back over the voice channel 238, store the message in memory 204 and visually represent the message with an icon 210 in the UI 208. For instance, device 202 establishes a voice call over the voice channel 238 with the message server 216. The message is accessed (e.g., directly or by navigating menus) and the message server begins playback of the voice message. The playback may be transmitted to the device 202 as an audio stream. The message module 206 records the message stream and stores it in the memory 204 and may also generate a visual notification of the voice message for the UI. The voice call may be established and the message recorded in response to user input and/or in a manner that is transparent or semi-transparent to the user.

Visually representing a message enables a user to identify who the message is from and/or get a quick understanding of the status of the message without requiring the user to listen to the message. The visual notification can be displayed even before the user's device has retrieved the message. Embodiments of the invention enable a user to listen to a particular message without navigating the menus of any particular voice message system. The device simply uses the notification data to directly access the message such as by calling a specific call back number and/or by issuing a DTMF message request. This eliminates the need to listen to hierarchical voice-driven menus. Embodiments of the invention also enable the recording and storage of voice messages while the user is roaming or outside of a data network but still inside a voice network.

There are various advantages to storing and retrieving voice messages as described herein. First, having a visual notification of a voice message that has not yet been delivered to a device because the device is roaming or out of data coverage helps the user to decide whether to simply wait for the message to be delivered or to call in to retrieve the message. Transmitting a call back number and/or a message identifier with a message-waiting notification permits retrieval of a particular message without navigating voice-driven menus. Additionally, recording a voice message played back to a device and storing the recording on the device enables a device user to immediately retrieve the message in the future without the need to establish a connection with a data network, a message server and/or navigate voice menus.

Embodiments of the invention will now be discussed with respect to FIGS. 3, 4 and 5. Those skilled in the art will appreciate that the methods disclosed herein can be implemented individually or jointly in numerous combinations.

Figure 3:
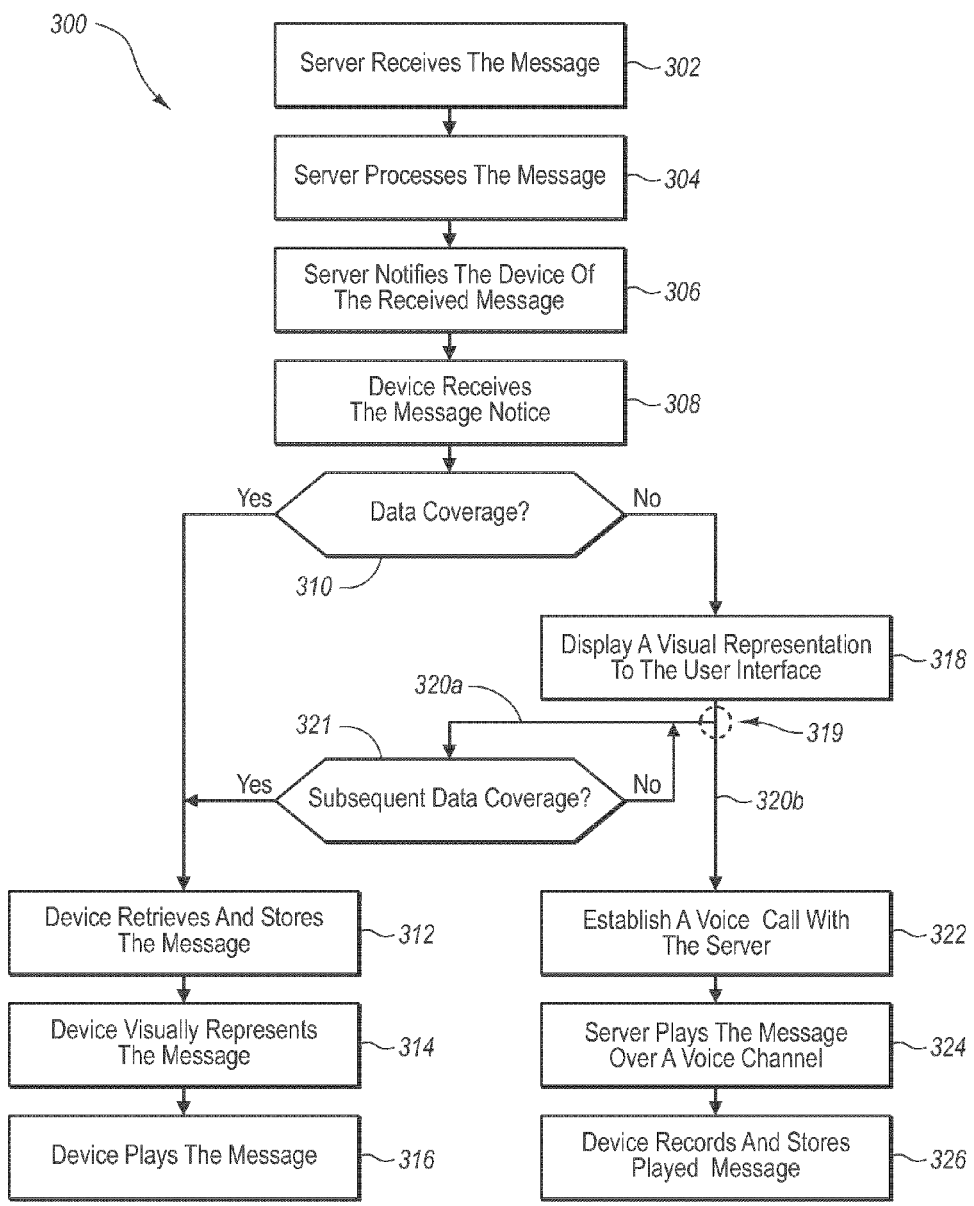
FIG. 3 is a flowchart illustrating an example process for alerting a device user that a message has been received.

In FIG. 3, a method 300 for notifying a device user that a voice message has been received when the device is out of data coverage is illustrated. The process often begins by the message server receiving 302 a voice message. The voice message can be first received at any voice message system or at the message server. When the voice message is received at a specific voice message system, that system may be configured to forward the voice message and/or a notification of the voice message to the message server. Alternately, the message server may retrieve the voice messages automatically.

Next, the message server processes 304 the voice message. This may include, by way of example, identifying the source of the message, identifying a device identifier for an intended recipient's device 202, assigning the device identifier, a message identifier and/or call back number to the message, and the like, or any combination thereof. Then, the message server can send 306 a message-waiting notification to the device of the intended recipient. As previously stated, the notification data sent to the device may comprise an SMS message and/or may include the call back number, date and time information, contact information, and the like, or any combination thereof.

The device receives 308 the message-waiting notification and determines 310 whether the device is within a data network coverage area in order to retrieve the voice message from the server. If the device is within data coverage, it retrieves and stores 312 the voice message and uses the notification data to visually represent 314 the voice message or otherwise make the user aware of the accessibility of the voice message. Upon user selection of the corresponding visual notification, the device plays 316 the voice message.

If the device is out of data coverage, the device nevertheless makes the user aware that a message is waiting. In one embodiment, this includes displaying 318 a visual notification to the device UI, the visual notification being generated by the message module 206 in one embodiment. This visual notification for the non-retrieved message may include, by way of example, instructions for the user to call the message server to retrieve the message. In one embodiment, the callback number is transparent to the recipient and dialed automatically by the device when the recipient retrieves the message. Optionally, the visual notification may include a prompt asking the recipient if the recipient would like to record/store the retrieved voice message onto the device, or the device may simply automatically record it and store it.

After the visual notification for the non-retrieved message has been displayed to the device UI, either or both of two steps may be taken, depending on the implementation of the invention. As shown at node 319 of the flow diagram of FIG. 3, the method can proceed along path 320a, along path 320b, or both. As further explained below, the steps of the methods that result from following path 320a and 320b are not mutually exclusive.

As illustrated at path 320a, the device can determine 321 whether it is subsequently in a data network. For instance, the device user may be walking or driving somewhere or otherwise be in motion with the device, potentially moving the device in and out of data coverage. Subsequent data coverage permits the device to retrieve and store 312 the voice message, etc. as already discussed. If still outside data coverage, the device may make repeated determinations 321 on a periodic or non-periodic basis, automatically or in response to user input.

Alternately or in addition to path 320a, the method can proceed on path 320b. In this case, either automatically or at the user's request, the device can establish 322 a voice call with the server to retrieve the message whereupon the server plays back 324 the message to the device over a voice channel. Furthermore, optionally, the device can record and store 326 the played back message to store the message locally at the device.

Figure 4:
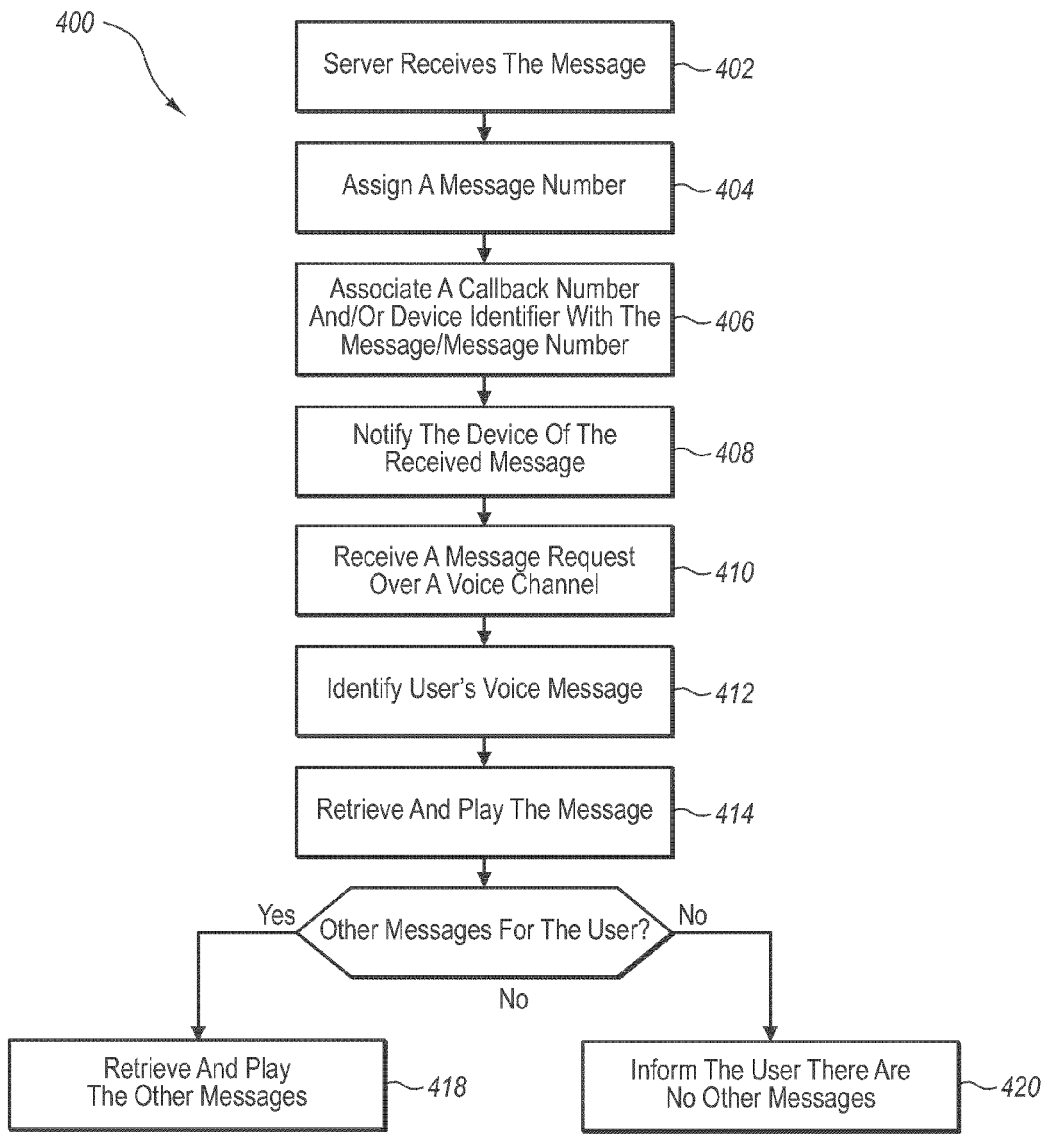
FIG. 4 illustrates a method for directly accessing a particular voice message without requiring the navigation of a voice message menu system.

FIG. 4 illustrates in detail how the call back number and/or message identifier can be used to directly access the message without navigating a voice message menu system on the message server. FIG. 5 illustrates how the device can establish a call with the server to retrieve the message over a voice channel and record the played back message. Embodiments of the inventions associated with FIGS. 4 and 5 can therefore be used in conjunction with the method 300 of FIG. 3.

Turning now to FIG. 4, a method 400 for directly accessing a particular voice message without navigating a voice message menu is illustrated. As already mentioned, the method 400 can be used in conjunction with the method 300 of FIG. 3 wherein the device is out of data coverage when a message-waiting notification is received. However, the method 400 can also be used in other circumstances without regard to being in or out of data coverage at any time during the method 400.

The process 400 begins with the message server receiving 402 a voice message intended for a particular recipient. The message server processes and stores the voice message as already discussed. Specifically, the server may assign 404 a message identifier to the message. The server can also associate 406 a device identifier for the device of the intended recipient and/or a call back number with the message. The call back number may be a unique phone number assigned in round-robin fashion from a bank of predetermined numbers for the device to dial to retrieve the specific message if only a voice connection is available. While the assigning and associating steps 404, 406 are illustrated as two separate steps, they may be rolled up into one step. Hence, in one embodiment, the assigned message identifier may include the associated call back number. Alternately or additionally, the message identifier may include an identifier for retrieving the message over a data connection. The associating of the device identifier and/or call back number with the message may include, for instance, storing the message in the queue of the intended recipient in the lookup tables of FIG. 1B or 1C. As already discussed, a message identifier and/or callback number can be used to identify particular messages within each message queue.

The method 400 continues by sending 408 a message-waiting notification to the recipient device 202. The notification can include the call back number and may include instructions to call the message server to retrieve the voice message. Alternately, the notification can include the assigned message identifier that can be used to retrieve the message in a data session or can be used to retrieve the message using DTMF tones in a voice connection. In some embodiments, the user interface of the recipient device may include a user prompt asking the device user if the user would like to retrieve the voice message. Upon receiving user input in the affirmative, the device can dial the call back number. In one embodiment, the device can be configured to automatically dial the call back number without receiving user input.

Voice calls made to any one of the call back numbers connect with the message server. Thus, after receiving the notification, the device can be used to make a voice call to the message server at the call back number (or another number associated with the message server) in order to request the message. The message server receives 410 the message request and identifies a device identifier for the device from which the voice call originates, for example, using ANI in one embodiment. The message server may use a device interface or other module to perform this identification.

As part of receiving the message request, the message server may identify the call back number at which the voice call/message request is received using a technology such as DNIS. Accordingly, the message server can use the device identifier and call back number pair to identify 412 the location of voice messages associated with the user. In particular, the device identifier can be used to identify a specific message queue associated with the device user and the call back number can identify the specific message, as in the embodiment of FIG. 1C.

In another embodiment, the message request is received over a voice channel as a DTMF message request. In this case, the message server can use the device identifier and message identifier received in the DTMF message request to identify 412 the location of voice messages associated with the user. For example, the device identifier can be used to identify the specific message queue associated with the device user and the message identifier can be used to identify the specific message, as in the embodiment of FIG. 1B.

Once the desired message has been identified 412, the message server retrieves and plays back 414 the voice message to the device.

In one embodiment, the message server may retain a bank of one hundred or more call back numbers, although fewer call back numbers can also be used. Because each device will be associated with a device identifier, this enables the server to reuse the same call back number for multiple users. In one embodiment, this enables the server to identify and locate up to one hundred or more messages for each device identifier (see FIG. 1C). For instance, the same call back number can be used with a first device identifier to identify one message intended for a first recipient device and with a second device identifier to identify a different message intended for a second recipient device, and so on. However, adding a unique message identifier can also provide certain benefits such that a single call back number can be assigned to each user (see FIG. 1B).

After retrieving and playing back 414 the particular message to the recipient device, the message server may optionally determine 416 whether there are other messages for the recipient device. To do this, the message server has already identified the device and so can query the corresponding queue for other messages associated with that device. If the search identifies one or more additional voice messages, the additional voice messages can be retrieved and played back 418 by the message server. The message server may include conventional voicemail server functionality such as interactive voice response ("IVR") prompts to thereby permit the device user to navigate through the additional voice messages. DTMF signaling can be used to retrieve and play 418 the additional voice messages. In the event the message server does not identify or locate any additional voice messages, the message server may so inform 420 the user.

Figure 5:
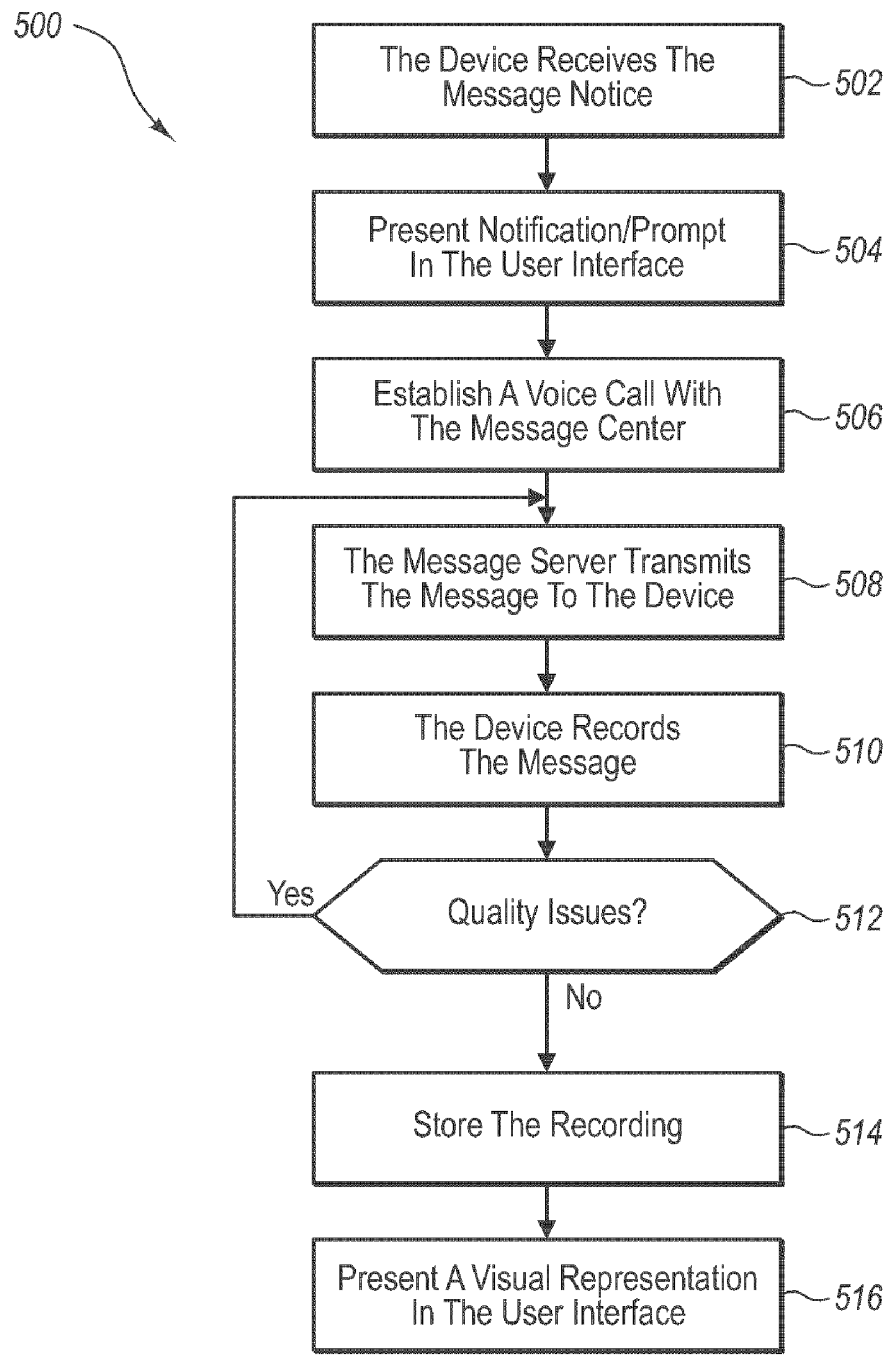
FIG. 5 is a flowchart illustrating a method for recording a message transmitted to a mobile device over a voice channel.

With reference to FIG. 5, a method 500 is illustrated for recording and storing played back voice messages while a recipient device is roaming, out of data coverage or is otherwise accessing voice messages over a voice channel. The process begins after the message server has received and processed a voice message intended for a recipient device and sent a message-waiting notification to the recipient device. The device receives 502 the message-waiting notification and optionally presents 504 a visual notification to a user. The visual notification may indicate that a message has been received and/or prompt the user to retrieve the message. In one embodiment, the user can suppress the prompt in the future so that retrieval is automatic.

After receiving the message-waiting notification, the device establishes 506 a voice call with the message server. This can be done automatically by the device or in response to user input. In one embodiment, the call is established on a call back number transmitted as part of the message and the particular message is accessed directly and played back as described above. However, the invention can also be implemented by navigating through menus, either automatically by the device via DTMF tones or other mechanisms, until a desired message is located and playback begins.

According to another embodiment of the invention, the message number or other message identifier can be transmitted in the message-waiting notification. The device can be used (automatically or in response to user input) to select the particular message with DTMF signaling. DTMF signaling can also be used to control playback of the message, permitting fast forward, fast backward, pause, skip, delete, and/or other operations to be performed on the message.

The message server transmits 508 the audio playback over a voice channel to the device as a stream which the device can record 510. The device may use the message module to record the voice message stream. Of course, if the device establishes a voice call with the message server to retrieve the voice message in response to user input, the device can render the message audibly through the device speaker and record the stream at the same time. On the other hand, if the device establishes a voice call with the message server to retrieve the voice message automatically, the device can simply record the stream without also audibly rendering the message to the user. In this manner, the process can be transparent to the user.

While the voice message stream is being recorded and/or after it has been recorded, the message module may determine 512 whether there are any quality problems with the recorded voice message. For instance, the message module may determine whether the voice call is dropped during transmission of the voice message stream and/or whether the recorded voice message is of poor audio quality. If there are any quality problems with the voice message recording, the device does not store the recording in memory. Instead, the device can request retransmission 508 of the voice message stream, which may require first establishing 506 another voice call with the message server.

If the voice message is of adequate quality, the device stores 514 the recorded voice message in memory and can alter the previous visual notification to present 516 a new visual notification, such as an icon, of the voice message in the device UI. The user can then, at a later time, select the new visual notification, initiating immediate playback of the voice message since the message is stored locally on the device. In addition to presenting the visual notification in the device UI, the device can use other visual, tactile and/or sensory notification alerting the device user that the message has been retrieved.

Whereas the device may be configured to automatically retrieve voice messages over a data channel as discussed with respect to step 312 of FIG. 3, properly syncing the device and the message server may be a concern when the device is used to retrieve and record voice messages over a voice channel. However, the device can simply be synced at a later time when the device is no longer roaming or outside of data coverage. Voice messages can be retrieved over a data channel and can then be used to replace the voice messages recorded and stored while being accessed over a voice channel. Alternately, the two copies of each voice message could both remain stored on the device.

Figure 6A:
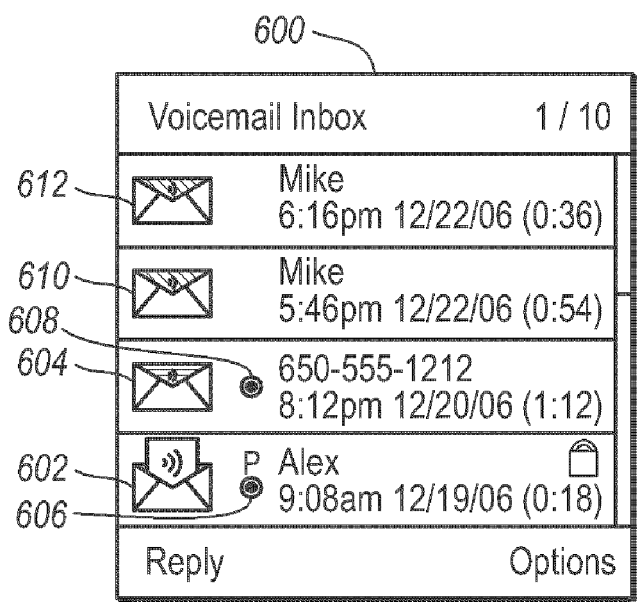
FIGS. 6A and 6B depict a sample user interface showing a message inbox which has messages that have been retrieved as well as messages that the user must dial-in to access.
Figure 6B:
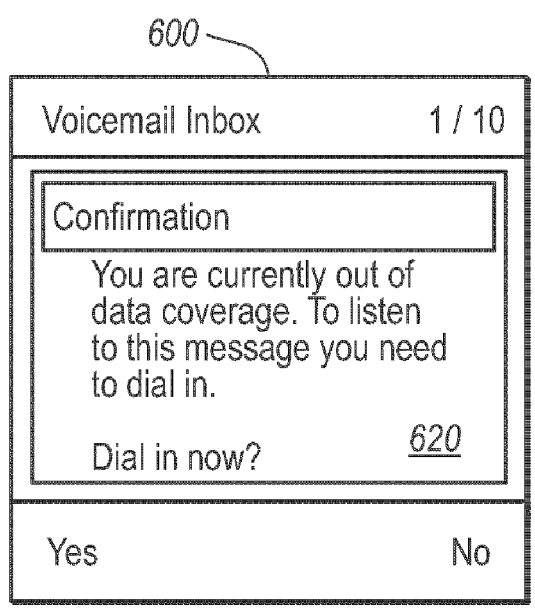

FIGS. 6A and 6B show a possible user interface of the messaging inbox on the device. FIG. 6A shows the inbox 600 with the bottom two messages, represented by icons 602, 604, displaying a "bullet" icon 606, 608 between the envelope and the name. The bullet icon 602, 604 indicates the message is resident on the device. The top two messages represented by the icons 610, 612, which may be displayed in a different color as well, don' show this bullet icon indicating that these messages are still on the server.

FIG. 6B shows an example of a notification 620 that might appear when a recipient clicks on a message that is not available on the recipient device and the device can not retrieve the message because it is not in data coverage.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions include, for example, instructions and data which cause a general purpose computer, special purpose computer, or special purpose processing device to perform a certain function or group of functions. Although the subject matter has been described in language specific to content module features and/or methodological acts, it is to be understood that the subject matter defined in claims that may cover the present invention is not necessarily limited to the specific features or acts described above. Rather, the specific features and acts described above are disclosed as example forms of implementing claims that may cover the present invention.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. On a mobile communication device, a method of recording a message transmitted to the device over a voice channel, the method comprising:
    by the mobile communication device, receiving a notification indicative of a message stored in a message server;
    by the mobile communication device, determining that a data channel is not available to the mobile communication device; and
    by the mobile communication device, in response to determining that the data channel is not available to the mobile communication device:
        automatically establishing a voice call with the message server to retrieve the message;
        automatically receiving the message from the message server over the voice channel; and
        automatically recording and locally storing the message received over the voice channel as a voice message in a message box of the mobile communication device.

2. The method of claim 1, wherein the notification indicative of a received message includes a call back number; and wherein the mobile communication device establishes the voice call with the message server at the call back number, which causes the message server to retrieve and play back the message without requiring the navigation of a hierarchical messaging menu.

3. The method of claim 1, further comprising:
presenting a visual notification of the locally stored message in a user interface of the mobile communication device; and
in response to a user selecting the visual notification of the locally stored message, playing back the locally stored message.

4. The method of claim 3, further comprising presenting a plurality of visual notifications, each visual notification corresponding to a different message, wherein the plurality of visual notifications enable the corresponding messages to be accessed in a non-sequential manner.

5. The method of claim 1, further comprising, in response to recording the message, presenting a second notification in a user interface of the mobile communication device indicative of the recording of the message by the mobile communication device.

6. The method of claim 1, further comprising implementing dual-tone multi-frequency signaling to request the message from the message server.

7. The method of claim 1, wherein receiving a notification indicative of a message stored in a message server further comprises receiving notifications indicative of messages stored in the message server, the messages being received by the message server from distinct voicemail systems, each voicemail system associated with a user of the device.

8. A system comprising:
a mobile communication device configured to:
receive a notification indicative of a message stored in a message server;
determine that a data channel is not available to the mobile communication device; and
in response to determining that the data channel is not available to the mobile communication device:
automatically establish a voice call with the message server to retrieve the message;
automatically receive the message from the message server over the voice channel; and
automatically record and locally store the message received over the voice channel as a voice message in a message box of the mobile communication device.

9. The system of claim 8, wherein the notification indicative of a received message includes a call back number; and wherein the mobile communication device is further configured to establish the voice call with the message server at the call back number, which is configured to cause the message server to retrieve and play back the message without requiring the navigation of a hierarchical messaging menu.

10. The system of claim 8, wherein the mobile communication device is further configured to:
present a visual notification of the locally stored message in a user interface of the mobile communication device; and
in response to a user selecting the visual notification of the locally stored message, play back the locally stored message.

11. The system of claim 10, wherein the mobile communication device is further configured to present a plurality of visual notifications, each visual notification corresponding to a different message, wherein the plurality of visual notifications enable the corresponding messages to be accessed in a non-sequential manner.

12. The system of claim 8, wherein the mobile communication device is further configured to, in response to recording the message, present a second notification in a user interface of the mobile communication device indicative of the recording of the message by the mobile communication device.

13. The system of claim 8, wherein the mobile communication device is further configured to implement dual-tone multi-frequency signaling to request the message from the message server.

14. The system of claim 8, wherein the mobile communication device is configured to receive the notification indicative of the message stored in the message server by:
receiving notifications indicative of messages stored in the message server, the messages being received by the message server from distinct voicemail systems, each voicemail system associated with a user of the device.

15. The system of claim 8, further comprising the message server.

16. The system of claim 15, further comprising a communication device that was used to create the message at the message server.

17. A system comprising:
a server configured to:
answer a voice call from a mobile communication device that automatically established the voice call in response to determining that a data channel is not available to the mobile communication device; and
send, over the voice call to the mobile communication device, a message, wherein the mobile communication device is configured to automatically record and locally store the message sent over the voice channel as a voice message in a message box of the mobile communication device.

18. The system of claim 17, further comprising the mobile communication device.

19. The system of claim 18, further comprising a communication device that was used to create the message at the server.

20. A method comprising:
by a server, answering a voice call from a mobile communication device that automatically established the voice call in response to determining that a data channel is not available to the mobile communication device; and
by the server, sending, over the voice call to the mobile communication device, a message, wherein the mobile communication device is configured to automatically record and locally store the message sent over the voice channel as a voice message in a message box of the mobile communication device.

* * * * *